(12) United States Patent
Natu et al.

(10) Patent No.: US 9,122,780 B2
(45) Date of Patent: Sep. 1, 2015

(54) MONITORING RESOURCE USAGE BY A VIRTUAL MACHINE

(75) Inventors: Mahesh S. Natu, Sunnyvale, CA (US); Anil S. Keshavamurthy, Portland, OR (US); Alberto J. Munoz, Los Altos, CA (US); Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 13/528,628

(22) Filed: Jun. 20, 2012

(65) Prior Publication Data

US 2013/0346966 A1    Dec. 26, 2013

(51) Int. Cl.
G06F 9/455    (2006.01)
G06F 11/34    (2006.01)

(52) U.S. Cl.
CPC ........ *G06F 11/3409* (2013.01); *G06F 9/45558* (2013.01); *G06F 2009/45591* (2013.01); *G06F 2201/815* (2013.01); *G06F 2201/885* (2013.01)

(58) Field of Classification Search
CPC ....................................................... G06F 9/505
USPC ....................................................... 718/105, 1
See application file for complete search history.

(56) References Cited

U.S. PATENT DOCUMENTS

| | | | |
|---|---|---|---|
| 7,779,424 B2 | 8/2010 | Cherkasova et al. | |
| 2004/0205751 A1* | 10/2004 | Berkowitz et al. ................ | 718/1 |
| 2006/0005188 A1* | 1/2006 | Vega et al. ......................... | 718/1 |
| 2006/0020944 A1* | 1/2006 | King et al. ..................... | 718/104 |
| 2006/0200821 A1* | 9/2006 | Cherkasova et al. .............. | 718/1 |
| 2008/0295095 A1* | 11/2008 | Watanabe et al. ................. | 718/1 |
| 2009/0007108 A1* | 1/2009 | Hanebutte ......................... | 718/1 |
| 2009/0164990 A1* | 6/2009 | Ben-Yehuda et al. ............ | 718/1 |
| 2010/0005465 A1 | 1/2010 | Kawato | |
| 2010/0082319 A1 | 4/2010 | Cherkasova et al. | |
| 2011/0029971 A1* | 2/2011 | Yamasaki et al. ................ | 718/1 |
| 2011/0197003 A1* | 8/2011 | Serebrin et al. .............. | 710/267 |
| 2012/0137101 A1 | 5/2012 | Arcese et al. | |
| 2013/0268799 A1* | 10/2013 | Mestery et al. ................ | 714/4.2 |

FOREIGN PATENT DOCUMENTS

KR    1020090068833    6/2009

OTHER PUBLICATIONS

Andrew S. Tanenbaum, Modern Operating Systems, 3rd Edition, 2008, p. 570-571.*
International Search Report and Written Opinion mailed Sep. 6, 2013 for International Application No. PCT/US2013/041845, 9 pages.
International Preliminary Report on Patentability mailed Dec. 31, 2014 for International Application No. PCT/US2013/041845, 6 pages.

* cited by examiner

*Primary Examiner* — Emerson Puente
*Assistant Examiner* — Charlie Sun
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for tracking per-virtual machine ("VM") resource usage independent of a virtual machine monitor ("VMM"). In various embodiments, a first logic unit may associate one or more virtual central processing units ("vCPUs") operated by one or more physical processing units of a computing device with a first VM of a plurality of VMs operated by the computing device, and collect data about resources used by the one or more physical processing units to operate the one or more vCPUs associated with the first VM. In various embodiments, a second logic unit of the computing device may determine resource-usage by the first VM based on the collected data. In various embodiments, the first and second logic units may perform these functions independent of a VMM of the computing device.

30 Claims, 5 Drawing Sheets

MONITORING RESOURCE USAGE BY A VIRTUAL MACHINE

FIELD

Embodiments of the present invention relate generally to the technical field of data processing, and more particularly, to monitoring resource usage by one or more virtual machines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Shared computing resources such as web servers or data centers may utilize virtualization to isolate users/customers from each other. A virtual machine monitor ("VMM") may operate one or more virtual machines ("VM") on the shared computing resource. Some VMMs may have the ability to monitor resource usage on a per-VM basis. This may enable various VM-related capabilities, such as workload balancing, chargeback, Quality of Service ("QoS") enforcement, and so forth.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "logic," "logic unit" or "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
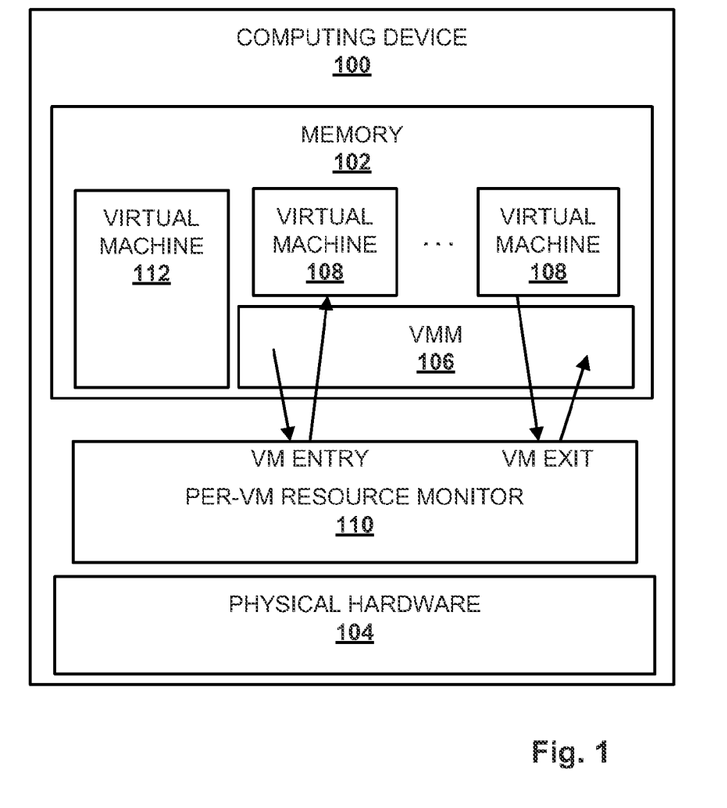
FIG. 1 schematically illustrates an example of how components may be configured with applicable portions of the teachings of the present disclosure, in accordance with various embodiments.
Figure 5:
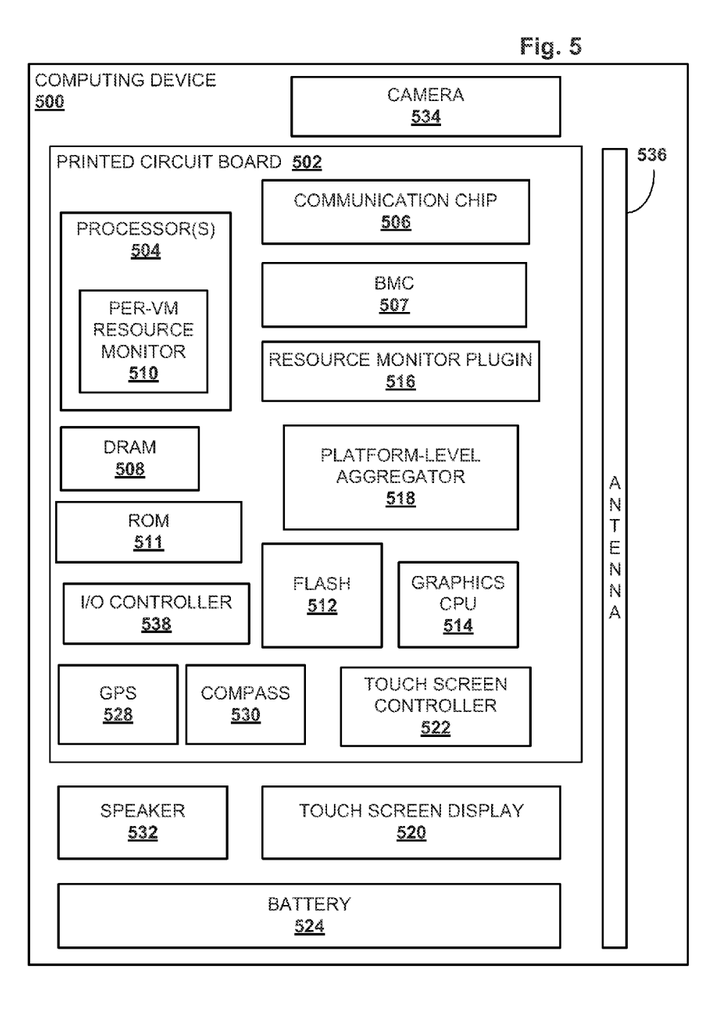
FIG. 5 schematically depicts an example computing device on which disclosed methods and computer-readable media may be implemented, in accordance with various embodiments.

Referring now to FIG. 1, an example computing device 100 for operating one or more virtual machines ("VM"), and which may be referred to as a "managed virtualized server," may include memory 102 and other physical hardware 104. While not shown in FIG. 1, physical hardware 104 may include various components such as one or more physical processing units (e.g., processor cores), associated firmware, one or more input/output ("I/O") devices, and so forth. Many such components are depicted in FIG. 5.

In various embodiments, VMM 106 may be referred to as a "user-installed" and/or "guest" VMM. In various embodiments, a VM may be a container. An operating system and one or more applications may be executed within that container. During the execution, a VM may consume computing resources such as processor cycles, cache and memory bandwidth, and may compete with other VMs for these computing resources. Therefore, resource utilization of each VM may be monitored. For example, VMM 106 may be configured to monitor per-VM resource usage.

Physical hardware 104 (e.g., microprograms associated with one or more physical processing units) may be configured to provide various capabilities, such as cache Quality of Service ("QoS") monitoring and/or memory bandwidth monitoring, that may be useful for determining per-VM resource usage. However, VMM 106 may not be designed to take advantage of these capabilities. Accordingly, in various embodiments, one or more logic units of computing device 100 may be configured to determine per-VM resource usage independently of VMM 106.

For example, in FIG. 1, one or more logic units of computing device 100 may act as a per-VM resource monitor 110. In various embodiments, per-VM resource monitor 110 may cooperate with other logic units of computing device 100 and/or outside of computing device 100, to facilitate per-VM resource monitoring. In various embodiments, per-VM resource monitor 110 may be configured to intercept scheduling of a virtual central processing unit ("vCPU"), associate the vCPU with one or more physical processing units, and/or monitor resource utilization by the one or more physical processing units while the association between the vCPU and one or more physical processing units is active. As will be discussed further, per-VM resource monitor 110 may provide this information to other logic units, such as a platform-level aggregator and/or a resource monitor plugin, so that per-VM resource usage may be determined independently of VMM 106.

Per-VM resource monitor 110 may be implemented using various components in computing device 100. In various embodiments, per-VM resource monitor 110 may be operated by components such as microprograms associated with physical processing units. In FIG. 1, for instance, per-VM resource monitor 110 executes "underneath" (e.g., with a higher execution privilege than) VMM 106. In various embodiments, such as in FIG. 1, per-VM resource monitor 110 may be implemented outside of memory 102, e.g., in firmware such as microcode associated with one or more physical processing units of computing device 100. However, this is not meant to be limiting, and in various embodiments, per-VM resource monitor 110 may be implemented as software within memory 102. In some embodiments, per-VM resource monitor 110 may be implemented as a "root" VMM, and may operate one or more of its own VMs 112. As shown by the arrows, per-VM resource monitor 110 may be configured to observe VM entries and/or VM exits. One example of a logic unit that may be able to observe such VM entries and exits, and therefore may be used to implement per-VM resource monitor 110, is Intel® Virtualization Technology ("VT") microcode by the Intel® Corporation of Santa Clara, Calif.

Figure 2:
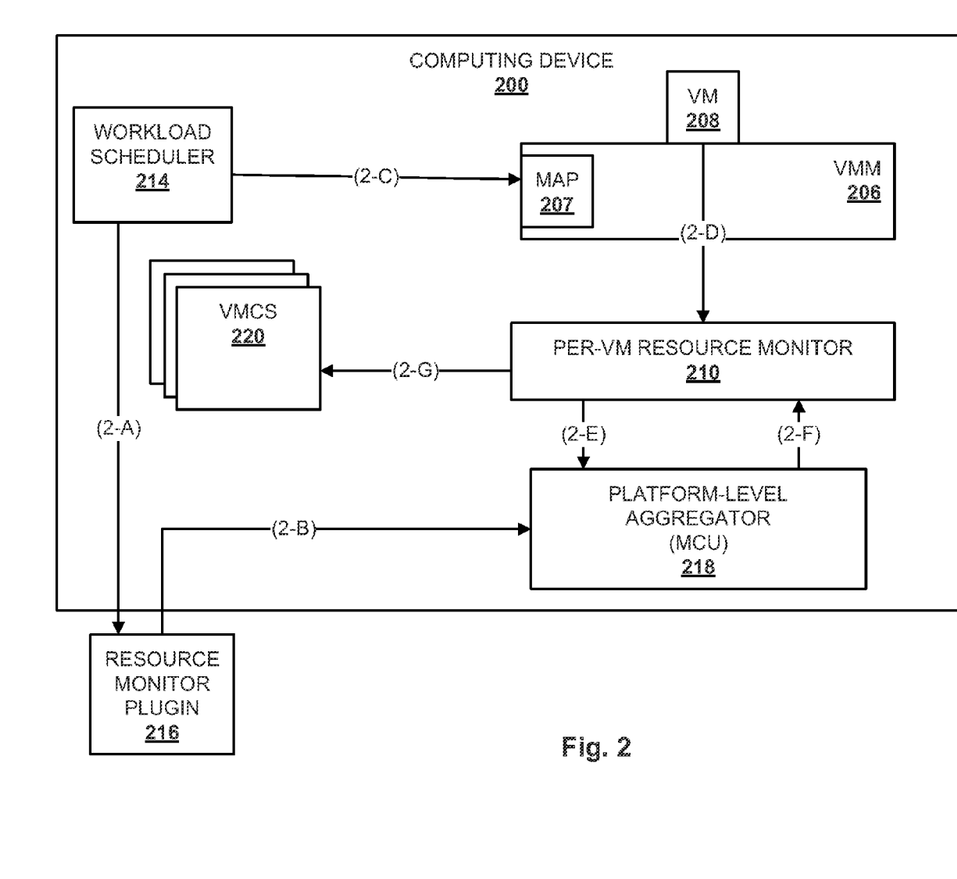
FIGS. 2-4 schematically illustrate examples of how various components may cooperate to monitor resource usage of a virtual machine, in accordance with various embodiments.
Figure 3:
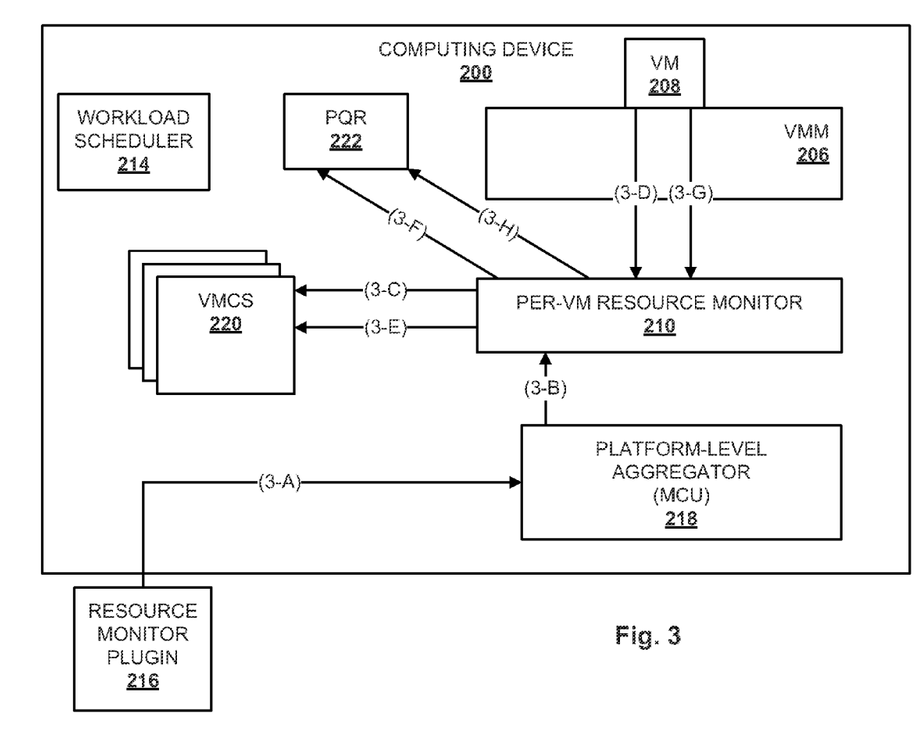
Figure 4:
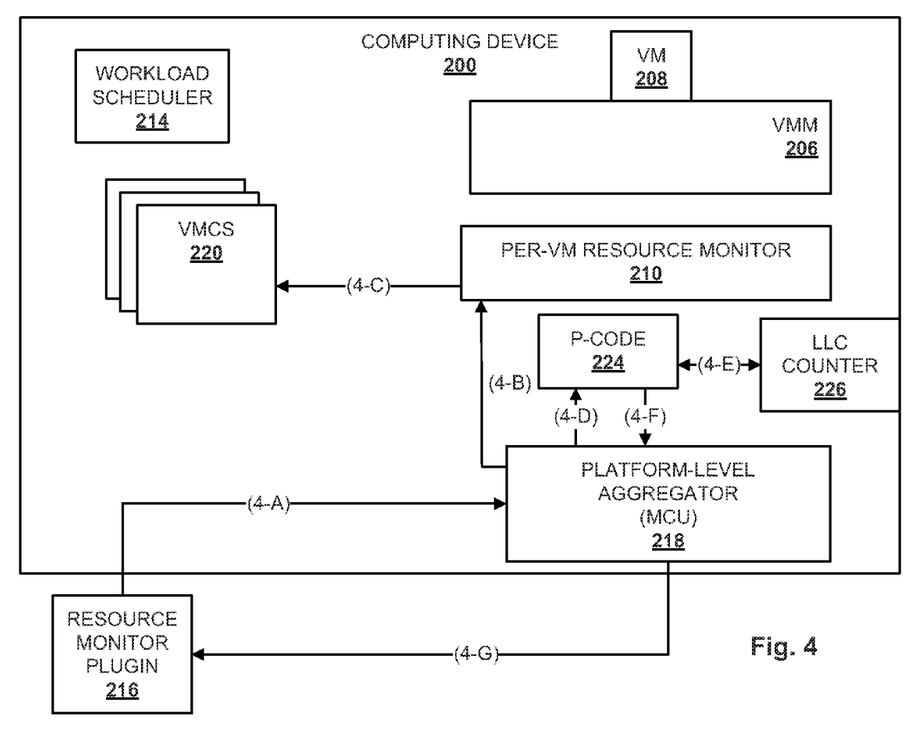

FIGS. 2-4 depict an example computing device 200, which may be similar to computing device 100 of FIG. 1, in various stages of operation. Like computing device 100, computing device 200 may be a managed virtualized server. In various embodiments, computing device 200 may include logic units configured with applicable portions of the present disclosure to cooperatively track per-VM resource usage independently of a VMM. FIG. 2 depicts computing device 200 making preparations to monitor per-VM resource usage. FIG. 3 depicts how computing resources used by one or more vCPUs associated with a VM may be monitored. FIG. 4 depicts how monitored vCPU resource usage may be aggregated, to determine per-VM resource usage.

Computing device 200 may operate a VMM 206, which may be similar to the guest VMM 106 of FIG. 1. VMM 206 may be configured to operate one or more VMs 208, which may be similar to the VMs 108 in FIG. 1. In various embodiments, VMM 206 may include a management access point ("MAP") 207, as well as other components that are not shown in FIG. 2, such as a component that creates and/or destroys VMs.

A workload scheduler 214 may instruct VMM 206 to initiate VMs 208. In various embodiments, workload scheduler may operate on a different computing device than computing device 200. For example, in various embodiments, workload scheduler 214 may be implemented on a separate computing device, such as a VM management computing device (not shown) that manages a workload of a plurality of managed virtualized servers such as computing device 200. For instance, computing device 200 may be one of a plurality of computing devices that together form a data center (not shown), and workload scheduler 214 may manage a workload of the data center.

A resource monitor plugin 216 may be provided to initiate and/or control resource-monitoring of VMs 208. Similar to workload scheduler 214, resource monitor plugin 216 may be implemented on a separate computing device, such as a VM management computing device (not shown). In various embodiments, resource monitor plugin 216 may have access to a wider view than just computing device 200, such as all computing devices (e.g., 200) of an entire data center (not shown). As will be described below, resource monitor plugin 216 may be privy to when a new VM is scheduled, and may notify logic units on computing devices such as computing device 200 accordingly.

A per-VM resource monitor 210, which may be similar to per-VM resource monitor 110 of FIG. 1, may provide the functionality described above. In various embodiments, per-VM resource monitor 210 may be implemented in microcode, associated with one or more physical processing units (not shown) of computing device 100, that includes instructions that, when executed, carry out applicable portions of the present disclosure. A "microprogram" may refer to a computer program that is operated when microcode is executed, and so in some embodiments, per-VM resource monitor 210 may be a microprogram.

A platform-level aggregator 218 may be executed by a microcontroller unit ("MCU"), as shown in FIG. 2, or it may be implemented in other components, such as a root VMM executing underneath a guest VMM (e.g., VMM 106 in FIG. 1), a management engine ("ME"), e.g., by the Intel® Corporation, a baseboard management controller ("BMC") and/or a system management mode ("SMM") component. In various embodiments, platform-level aggregator 218 may have a platform-wide view of interactions between other components. In various embodiments, platform-level aggregator 218 may be configured to identify vCPUs associated with a particular VM, as will be described below. In various embodiments, platform-level aggregator 218 may be configured to aggregate resource usage data provided by other logic units, such as per-VM resource monitor 210, to expose per-VM resource utilization on a platform such as computing device 200 to, e.g., resource monitor plugin 216.

FIG. 2 depicts example communications that may be exchanged between various components to prepare to monitor per-VM resource-usage, in accordance with various embodiments. At arrow 2-A, workload scheduler 214 may inform resource monitor plugin 216 that workload scheduler 214 is about to instruct VMM 206 to initiate a new VM on a computing device 200. In various embodiments, the new VM may be identified by a new virtual machine identifier, or "VMID." In various embodiments, a VMID may be any sequence of computer-readable symbols, such as numbers, characters or other symbols, that may be used to identify a particular VM. In various embodiments, a uni-processor VM ("UP VM") may be operated by a single vCPU, and a multi-processor VM ("MP VM") may be operated by more than one vCPU. In the latter case, all vCPUs that operate the MP VM may be identified with the same VMID, as will be discussed below.

At arrow 2-B, resource monitor plugin 216 may notify platform-level aggregator 218 that the new VM is being initiated. At arrow 2-C, workload scheduler 214 may direct VMM 206 to initialize the new VM. VMM 206 may create a virtual machine control structure ("VMCS") 220 for each vCPU initiated for the new VM. In various embodiments, a VMCS 220 may be created, e.g., by VMM 206, for each new vCPU that is initialized by VMM 206, which is why there are multiple VMCSs 220 shown in FIGS. 2-4. In various embodiments, VMM 206 may execute a VMLAUNCH instruction to initialize a vCPU.

In various embodiments, at arrow 2-D, initialization of one or more vCPUs (e.g., the VMLAUNCH instruction) may cause per-VM resource monitor 210 to perform various operations. For instance, at arrow 2-E, per-VM resource monitor 210 may alert platform-level aggregator 218 that one or more new vCPUs has been launched and may provide an association between the new vCPUs and a new or existing VM 208. For instance, in various embodiments, per-VM resource monitor 210 may provide platform-level aggregator 218 with a pointer to memory storing the VMCS 220 associated with a new vCPU. In various embodiments, per-VM resource monitor 210 may also provide a pointer to an extended page table ("EPTP") associated with the new vCPU. If VMM 206 permits EPTP switching, e.g., using VMFUNC (0) in processors made by the Intel® Corporation of Santa Clara, Calif., pointers to all pertinent EPTPs may be provided by per-VM resource monitor 210 to platform-level aggregator 218.

In various embodiments, platform-level aggregator 218 may maintain a lookup table of records. In various embodiments, each record may represent an association between a vCPU and a VM 208, and may include a VMID, a VMCS pointer and/or an EPTP. When platform-level aggregator 218 is alerted of a new vCPU launch, platform-level aggregator 218 may compare a characteristic associated with the new vCPU, such as an EPTP, against existing records in the lookup table. If the characteristic is not found, platform-level aggregator 218 may determine that the launch of the new vCPU constitutes a launch of a new VM 208, and that the new VMID provided by resource monitor plugin 216 (e.g., at arrow 2-B) should be used to identify the VM 208. If the characteristic is found (e.g., the new vCPU has an EPTP that matches an EPTP of a record of the lookup table), platform-level aggregator 218 may conclude that there is a new vCPU being initiated for an existing VM 208, and that an existing VMID associated with the existing VM 208 should be used instead.

In various embodiments, at arrow 2-F, platform-level aggregator 218 may direct per-VM resource monitor 210 to associate the new vCPU with a particular (new or existing) VM 208 identified by the VMID. In various embodiments, at arrow 2-G, per-VM resource monitor 210 may do so, e.g., by storing, in the newly-created VMCS 220 (also referred to as "tagging the VMCS"), the VMID (associated with a new or existing VM) provided by resource monitor plugin 216.

Turning now to FIG. 3, when it is desired to monitor resource usage by a particular VM 208, resource monitor plugin 216 may request, at arrow 3-A, that platform-level aggregator 218 monitor resource usage by VM 208. In various embodiments, the request may include a VMID corresponding to VM 208. Various types of resource usage may be monitored. In various embodiments, the request may be to monitor cache usage by VM 208, or to monitor memory bandwidth usage.

Platform-level aggregator 218 may consult with its lookup table to identify one or more pointers to one or more VMCSs 220 marked with the given VMID. In various embodiments, platform-level aggregator 218 may allocate a resource monitor identifier ("RMID") to be used during the resource-usage monitoring process. While a RMID is used in the examples herein, that is not meant to be limiting. It should be understood that, in various embodiments, other identifiers that may or may not already exist and be associated with VMs, such as VMID, may be used for the same or similar purposes as the RMID.

At arrow 3-B, platform-level aggregator 218 may direct per-VM resource monitor 210 to collect data about the resources used by one or more physical processing units to operate one or more vCPUs associated with the VMCSs 220 marked with the given VMID. In various embodiments, platform-level aggregator 218 may direct per-VM resource monitor 210 to store the allocated RMID in the corresponding VMCSs 220. At arrow 3-C, per-VM resource monitor 210 may store the RMID in the corresponding VMCS 220. In various embodiments, per-VM resource monitor 210 may store the RMID in a predetermined location inside each specified VMCS 220.

Per-VM resource monitor 210 may then collect data about resources used to operate a VM 208 by monitoring resources used by the one or more physical processing units that involve the one or more VMCSs with the stored RMID. At arrow 3-D, one or more vCPUs corresponding to one or more VMCSs 220 tagged by per-VM resource monitor 210 at arrow 3-C may be operated. In various embodiments, per-VM resource monitor 210 may learn of this through a VM entry (e.g., via a VMRESUME instruction in Intel® architectures). At arrow 3-E, per-VM resource monitor 210 may read a RMID from a corresponding VMCS 220. Per-VM resource monitor 210 may then collect data about resources used by the one or more physical processing units to operate the one or more vCPUs with VMCSs 220 marked with the RMID.

For example, at arrow 3-F in FIG. 3, per-VM resource monitor 210 may enable cache monitoring by storing the RMID in a platform quality-of-service register ("PQR") 222. This may cause one or more physical processing units associated with PQRs 222 to count cache occupancy against the specified RMID. Additionally or alternatively, per-VM resource monitor 210 may initiate a memory bandwidth monitor (not shown) to collect the data about the resources used by one or more physical processing units to operate the one or more vCPUs corresponding to the VMCSs 220 tagged with the RMID.

Eventually, one or more vCPUs associated with VM 208 being monitored may stop execution. For example, VM 208 being monitored may exit, as shown at arrow 3-G. At that point, per-VM resource monitor 210 may cause the monitoring of vCPUs associated with VM 208, e.g., vCPUs corresponding to VMCSs 220 tagged with the RMID, to cease. For example, at arrow 3-H, per-VM resource monitor 210 may clear PQR 222.

Resource-usage statistics may be compiled and output in various ways in response to various events. For example, a user may utilize resource monitor plugin 216 to issue a command to stop resource monitoring and return resource-usage statistics of a VM 208. Referring now to FIG. 4, at arrow 4-A, resource monitor plugin 216 may (e.g., at the request of a user) direct platform-level aggregator 218 to cease monitoring resource usage by a particular VM 208, e.g., having a particular VMID, and to return resource usages statistics. Platform-level aggregator 218 may consult its lookup table to identify pointers to one or more VMCSs 220 marked with the VMID. In various embodiments, platform-level aggregator 218 may deallocate the RMID allocated to these VMCSs 220. At arrow 4-B, platform-level aggregator 218 may direct per-VM resource monitor 210 to clear the RMID from the corresponding VMCSs 220. At arrow 4-C, per-VM resource monitor 210 may clear the RMID from VMCSs 220 corresponding to the vCPUs operating VM 208.

Platform-level aggregator 218 may then direct per-VM resource monitor 210 or other components to return resource-usage data. For instance, at arrow 4-D, platform-level aggregator 218 may direct microprograms 224 associated with each physical processing unit (referred to as "P-code" in the drawings) to read a cache occupancy counter for the given RMID. At arrow 4-E, microprograms 224 may read appropriate cache occupancy counters, e.g., from last level cache ("LLC") 226.

At arrow 4-F, microprograms 224 may return cache occupancy information to platform-level aggregator 218. Platform-level aggregator 218 may then determine resource-usage by the VM 208 based on the collected data. For example, platform-level resource aggregator 218 may aggregate the collected data to determine resources used by the VM 208. At arrow 4-G, platform-level aggregator 218 may return the aggregated data to resource monitor plugin 216. Resource monitor plugin 216 may then perform various actions with the data, such as update a database, output a report, cause the data to be output to one or more users, and so forth.

Although the above examples describe, e.g., cache QoS monitoring, this is not meant to be limiting, and the concepts described herein are equally applicable to monitoring other types of resources used by a VM. For instance, a number of instructions retired by a VM may be monitored, e.g., by taking a snapshot of a Core Performance Monitor register at both VM entry and VM exit, and determining the difference. As another example, a reading of a digital power meter or other meter may be taken, e.g., at VM entry and exit, to determine energy consumed within a context of a VM.

FIG. 5 illustrates an example computing device 500, in accordance with various embodiments. Computing device 500 may include a number of components, a processor 504 and at least one communication chip 506. In various embodiments, the processor 504 may be a processor core. In various embodiments, the at least one communication chip 506 may also be physically and electrically coupled to the processor 504. In further implementations, the communication chip 506 may be part of the processor 504. In various embodiments, computing device 500 may include printed circuit board ("PCB") 502. For these embodiments, processor 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components may include, but are not limited to, a per-VM resource monitor 510 (shown as part of processor(s) 504 because it may be implemented as a microprogram), a BMC 507 (which may be configured with applicable portions of the teachings of the present disclosure), volatile memory (e.g., dynamic random access memory 508, also referred to as "DRAM"), non-volatile memory (e.g., read only memory 511, also referred to as "ROM"), flash memory 512, a graphics processor 514, a digital signal processor (not shown), a crypto processor (not shown), a resource monitor plugin 516 (which in various embodiments may operate on a separate, VM management computing device instead), a platform-level aggregator 518 (which in various embodiments may be an MCU configured with applicable portions of the teachings of the present disclosure), a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, an antenna 536, an input/output ("I/O") controller 538, and a mass storage device (such as hard disk drive, a solid state drive, compact disk ("CD"), digital versatile disk ("DVD"))(not shown), and so forth.

In various embodiments, volatile memory (e.g., DRAM 508), non-volatile memory (e.g., ROM 511), flash memory 512, and the mass storage device may include programming instructions configured to enable computing device 500, in response to execution by processor(s) 504, to practice all or selected aspects of the operations shown in FIGS. 2-4. For example, one or more of the memory components such as volatile memory (e.g., DRAM 508), non-volatile memory (e.g., ROM 511), flash memory 512, and the mass storage device may include temporal and/or persistent copies of instructions configured to enable computing device 500 to practice disclosed techniques, such as all or selected operations shown in FIGS. 2-4.

The communication chip 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various embodiments, processor 504 (or one of its processor cores) may be packaged together with one or more of the logic units described herein for monitoring VM resource-usage, including but not limited to per-VM resource monitor (e.g., 110, 210, 510), platform-level aggregator (e.g., 218, 518), and/or resource monitor plugin (e.g., 216, 516). For one embodiment, processor 504 (or one of its processor cores) may be packaged together with one or more of the logic units described herein for monitoring VMM resource-usage, including but not limited to per-VM resource monitor (e.g., 110, 210, 510), platform-level aggregator (e.g., 218, 518), and/or resource monitor plugin (e.g., 216, 516), to form a System in Package (SiP). For one embodiment, processor 504 (or one of its processor cores) may be packaged together with one or more of the logic units described herein for monitoring VMM resource-usage, including but not limited to per-VM resource monitor (e.g., 110, 210, 510), platform-level aggregator (e.g., 218, 518), and/or resource monitor plugin (e.g., 216, 516), and may be integrated on the same die. For one embodiment, processor 504 (or one of its processor cores) may be packaged together with one or more of the logic units described herein for monitoring VMM resource-usage, including but not limited to per-VM resource monitor (e.g., 110, 210, 510), platform-level aggregator (e.g., 218, 518), and/or resource monitor plugin (e.g., 216, 516), to form a System on Chip (SoC).

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

In various embodiments, computer-readable media (transitory and non-transitory), systems, methods, apparatus and computing devices may be provided to cooperatively track per-VM resource usage independent of a VMM. In various embodiments, a first logic unit may associate one or more virtual central processing units operated by one or more physical processing units of a computing device with a first virtual machine of a plurality of virtual machines operated by the computing device. In various embodiments, the first logic unit may collect data about resources used by the one or more physical processing units to operate the one or more virtual central processing units associated with the first virtual machine. In various embodiments, the first logic unit may perform the association and the collection independent of a virtual machine monitor of the computing device In various embodiments, a second logic unit of the computing device may direct the first logic unit to collect the data about the resources used by the one or more physical processing units to operate the one or more virtual central processing units associated with the first virtual machine. In various embodiments, the second logic unit may determine resource-usage by the first virtual machine based on the collected data. In various embodiments, the second logic unit may perform the direction and determination independent of a virtual machine monitor of the computing device.

In various embodiments, the second logic unit may aggregate the collected data to determine resources used by the first virtual machine. In various embodiments, the first logic unit may store, in one or more virtual machine control structures associated with the one or more virtual central processing units, an identifier of the first virtual machine. In various embodiments, the second logic unit may allocate a resource monitor identifier to the first virtual machine, responsive to a request to monitor resource-usage of the first virtual machine, and may direct the first logic unit to store, in one or more virtual machine control structures associated with the one or more virtual central processing units, the resource monitor identifier.

In various embodiments, the first logic unit may collect the data about resources used by the one or more physical processing units to operate the one or more virtual central processing units associated with the first virtual machine based on operations performed by the one or more physical processing units that involve the one or more virtual machine control structures with the resource monitor identifier.

In various embodiments, the first logic unit may provide, to the second logic unit, in response to initialization of a new virtual central processing unit, an association between the new virtual central processing unit and a virtual machine.

In various embodiments, the second logic unit may determine, based at least in part on the association provided by the first logic unit, whether the new virtual central processing unit is associated with a new virtual machine or an existing virtual machine. In various embodiments, the second logic unit may instruct the first logic unit to associate a new virtual machine identifier with the new virtual central processing unit where it is determined that the new virtual central processing unit is associated with a new virtual machine. In various embodiments, the second logic unit may instruct the first logic unit to associate an existing virtual machine identifier with the new virtual central processing unit where it is determined that the new virtual central processing unit is associated with an existing virtual machine.

In various embodiments, the first logic unit may provide, to the second logic unit, in response to initialization of a new virtual central processing unit, an association between the new virtual central processing unit, a virtual machine, and one or more extended page tables. In various embodiments, the second logic unit may determine, based at least in part on the one or more extended page tables, whether the new virtual central processing unit is associated with a new virtual machine or an existing virtual machine.

In various embodiments, the first logic unit may comprise a microprogram. In various embodiments, the first logic unit may have execution privilege higher than execution privilege of the virtual machine monitor and may be able to observe creation of new virtual central processing units.

In various embodiments, the second logic unit may be part of one or more of a microcontroller, a baseboard management controller and a system management mode component. In various embodiments, the second logic unit may have execution privileges higher than execution privileges of the virtual machine monitor.

In various embodiments, the first logic unit may initiate a cache quality-of-service monitor to collect the data about the resources used by the one or more physical processing units to operate the one or more virtual central processing units. In various embodiments, the first logic unit may initiate a memory bandwidth monitor to collect the data about the resources used by the one or more physical processing units to operate the one or more virtual central processing units.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium having computer-readable code embodied therein, the computer-readable code comprising instructions to provide a first logic unit and a second logic unit to a computing device;
   wherein the first logic unit, on execution of the instructions by the computing device, associates one or more virtual central processing units operated by one or more physical processing units of the computing device with a first virtual machine of a plurality of virtual machines operated by the computing device, and collects data about resources used by the one or more physical processing units to operate the one or more virtual central processing units associated with the first virtual machine, wherein the first logic unit performs the association and the collection using physical hardware capabilities different from virtual machine monitoring capabilities of a virtual machine monitor (VMM) of the computing device, and the association and the collection are not subject to influence from the VMM; and
   the second logic unit, on execution of the instructions by the computing device, directs the first logic unit to collect the data about the resources used by the one or more physical processing units to operate the first virtual machine, and determines resource-usage by the first virtual machine based on the collected data, wherein the second logic unit performs the direction and the determination using physical hardware capabilities different from the virtual machine monitoring capabilities of the VMM of the computing device, and the direction and the determination are not subject to influence from the VMM.

2. The at least one non-transitory computer-readable medium of claim 1, wherein the second logic unit, on execution of the instructions, aggregates the collected data to determine the resources used by the first virtual machine.

3. The at least one non-transitory computer-readable medium of claim 1, wherein the first logic unit, on execution of the instructions, stores, in one or more virtual machine control structures associated with the one or more virtual central processing units, an identifier of the first virtual machine.

4. The at least one non-transitory computer-readable medium of claim 1, wherein the second logic unit, on execution of the instructions, allocates a resource monitor identifier to the first virtual machine, responsive to a request to monitor resource-usage of the first virtual machine, and directs the first logic unit to store, in one or more virtual machine control structures associated with the one or more virtual central processing units, the resource monitor identifier; and wherein the first logic unit, on execution of the instructions, further collects the data about the resources used by the one or more physical processing units based on operations performed by the one or more physical processing units that involve the one or more virtual machine control structures with the resource monitor identifier.

5. The at least one non-transitory computer-readable medium of claim 1, wherein the first logic unit, on execution of the instructions, provides, to the second logic unit, in response to initialization of a new virtual central processing unit, an association between the new virtual central processing unit and a virtual machine different from the first virtual machine, wherein the virtual machine different from the first virtual machine is an existing virtual machine of the plurality of virtual machines or a new virtual machine.

6. The at least one non-transitory computer-readable medium of claim 5, wherein the second logic unit, on execution of the instructions, determines, based at least in part on the association provided by the first logic unit, whether the new virtual central processing unit is associated with an existing virtual machine of the plurality of virtual machines or a new virtual machine.

7. The at least one non-transitory computer-readable medium of claim 6, wherein the second logic unit, on execution of the instructions and in response to a determination that the new virtual central processing unit is associated with the new virtual machine, directs the first logic unit to associate a new virtual machine identifier with the new virtual central processing unit.

8. The at least one non-transitory computer-readable medium of claim 1, wherein the first logic unit, on execution of the instructions, provides, to the second logic unit, in response to initialization of a new virtual central processing unit, an association between the new virtual central processing unit, a virtual machine different from the first virtual machine, and one or more extended page tables, wherein the virtual machine different from the first virtual machine is an existing virtual machine of the plurality of virtual machines or a new virtual machine.

9. The at least one non-transitory computer-readable medium of claim 8, wherein the second logic unit, on execution of the instructions, determines, based at least in part on the one or more extended page tables, whether the new virtual central processing unit is associated with a new virtual machine or an existing virtual machine.

10. The at least one non-transitory computer-readable medium of claim 1, wherein the second logic unit comprises a microprogram.

11. The at least one non-transitory computer-readable medium of claim 1, wherein the second logic unit comprises a first VMM with an execution privilege higher than an execution privilege of a second VMM that manages the plurality of virtual machines.

12. The at least one non-transitory computer-readable medium of claim 1, wherein the first logic unit is part of one or more of a microcontroller, a baseboard management controller and a system management mode component.

13. The at least one non-transitory computer-readable medium of claim 1, wherein the first logic unit comprises a first VMM with an execution privilege higher than an execution privilege of a second VMM that manages the plurality of virtual machines.

14. The at least one non-transitory computer-readable medium of claim 1, wherein the first logic unit, on execution of the instructions, initiates a cache quality-of-service monitor or a memory bandwidth monitor to collect the data about the resources used by the one or more physical processing units to operate the one or more virtual central processing units.

15. A system comprising:
one or more physical processing units to operate a plurality of virtual central processing units to operate a plurality of virtual machines, and a virtual machine monitor (VMM) to manage the virtual machines;
per-virtual machine resource monitor circuitry to associate one or more of the virtual central processing units with a first virtual machine of the virtual machines, and to collect data about resources used by the one or more physical processing units to operate the one or more virtual central processing units associated with the first virtual machine, wherein the per-virtual machine resource monitor circuitry performs the association and the collection using physical hardware capabilities different from virtual machine monitoring capabilities of the VMM, and the association and the collection are not subject to influence from the VMM; and
platform-level aggregator circuitry to aggregate the collected data to determine resources used by the first virtual machine, wherein the platform-level aggregator circuitry performs the aggregation using physical hardware capabilities different from virtual machine monitoring capabilities of the VMM, and the aggregation is not subject to influence from the VMM.

16. The system of claim 15, wherein the per-virtual machine resource monitor circuitry is further to store, in one or more virtual machine control structures associated with the one or more virtual central processing units, an identifier of the first virtual machine.

17. The system of claim 15, wherein the platform-level aggregator circuitry is to allocate a resource monitor identifier to the first virtual machine, in response to a request to monitor resource-usage of the first virtual machine, and direct the per-virtual machine resource monitor circuitry to store, in one or more virtual machine control structures associated with the one or more virtual central processing units, the resource monitor identifier; and wherein the per-virtual machine resource monitor circuitry is further to collect the data about resources used by the one or more physical processing units based on operations performed by the one or more physical processing units that involve the one or more virtual machine control structures with the resource monitor identifier.

18. The system of claim 15, wherein the per-virtual machine resource monitor circuitry is further to provide, to the platform-level aggregator circuitry, in response to initialization of a new virtual central processing unit, an association between the new virtual central processing unit and a virtual machine different from the first virtual machine, wherein the virtual machine different from the first virtual machine is an existing virtual machine of the plurality of virtual machines or a new virtual machine.

19. The system of claim 18, wherein the platform-level aggregator circuitry is further to determine, based at least in part on the association provided by the per-virtual machine resource monitor circuitry, whether the new virtual central processing unit is associated with a new virtual machine or an existing virtual machine.

20. The system of claim 19, wherein the platform-level aggregator circuitry is further to, in response to a determination that the new virtual central processing unit is associated with the new virtual machine, direct the per-virtual machine resource monitor circuitry to associate a new virtual machine identifier with the new virtual central processing unit.

21. The system of claim 15, wherein the per-virtual machine resource monitor circuitry is further to provide, to the platform-level aggregator circuitry, in response to initialization of a new virtual central processing unit, an association between the new virtual central processing unit, a virtual machine different from the first virtual machine, and one or more extended page tables, wherein the virtual machine different from the first virtual machine is an existing virtual machine of the plurality of virtual machines or a new virtual machine; and
the platform-level aggregator circuitry is further to determine, based at least in part on the one or more extended page tables, whether the new virtual central processing unit is associated with an existing virtual machine of the plurality of virtual machines or a new virtual machine.

22. The system of claim 15, wherein the per-virtual machine resource monitor circuitry comprises a microprogram.

23. The system of claim 15, wherein the VMM is a first VMM, and the per-virtual machine resource monitor circuitry or platform-level aggregator circuitry comprises a second VMM with an execution privilege higher than an execution privilege of the first VMM.

24. The system of claim 15, wherein the platform-level aggregator circuitry comprises one or more of a microcontroller, a baseboard management controller and a system management mode component.

25. The system of claim 15, wherein the per-virtual machine resource monitor circuitry is to initiate a cache quality of service monitor to collect the data about the resources used by the one or more physical processing units to operate the one or more virtual central processing units.

26. The system of claim 15, wherein the per-virtual machine resource monitor circuitry is to initiate a memory bandwidth monitor to collect the data about the resources used by the one or more physical processing units to operate the one or more virtual central processing units.

27. A computer-implemented method, comprising:
directing, by a first logic unit of a computing device, a second logic unit of the computing device to collect data about resources used by one or more physical processing units of the computing device to operate a first virtual machine of a plurality of virtual machines;
associating, by the second logic unit, one or more virtual central processing units operated by the one or more physical processing units of the computing device with the first virtual machine;
collecting, by the second logic unit, data about resources used by the one or more physical processing units to operate the one or more virtual central processing units associated with the first virtual machine; and
aggregating, by the first logic unit, the collected data to determine resource-usage by the first virtual machine;
wherein the first logic unit performs the directing and the determining using physical hardware capabilities different from virtual machine monitoring capabilities of a virtual machine monitor (VMM) of the computing device, and the directing and the determining are not subject to influence from the VMM, and
wherein the second logic unit performs the associating and the collecting using physical hardware capabilities different from virtual machine monitoring capabilities of the VMM of the computing device, and the associating and the collecting are not subject to influence from the VMM.

28. The computer-implemented method of claim 27, further comprising storing, by the second logic unit, in one or more virtual machine control structures associated with the one or more virtual central processing units, an identifier of the first virtual machine.

29. The computer-implemented method of claim 27, further comprising allocating, by the first logic unit, a resource monitor identifier to the first virtual machine, in response to a request to monitor resource-usage of the first virtual machine;
directing, by the first logic unit, the second logic unit to store, in one or more virtual machine control structures associated with the one or more virtual central processing units, the resource monitor identifier; and
collecting, by the second logic unit, the data about resources used by the one or more physical processing units based on operations performed by the one or more physical processing units that involve the one or more virtual machine control structures with the resource monitor identifier.

30. The computer-implemented method of claim 27, further comprising:
providing, by the second logic unit, to the first logic unit, in response to initialization of a new virtual central processing unit, an association between the new virtual central processing unit and a virtual machine different from the first virtual machine, wherein the virtual machine different from the first virtual machine is an existing virtual machine of the plurality of virtual machines or a new virtual machine; and
determining, by the first logic unit, based at least in part on the association provided by the second logic unit, whether the new virtual central processing unit is associated with an existing virtual machine of the plurality of virtual machines or a new virtual machine.

* * * * *